(12) United States Patent
Fujisaki et al.

(10) Patent No.: US 11,463,565 B2
(45) Date of Patent: Oct. 4, 2022

(54) IMAGE CAPTURING DEVICE AND MOBILE ELECTRONIC DEVICE

(71) Applicant: AAC Optics Solutions Pte. Ltd., Singapore (SG)

(72) Inventors: Yoshifumi Fujisaki, Osaka (JP); Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 396 days.

(21) Appl. No.: 16/729,460

(22) Filed: Dec. 29, 2019

(65) Prior Publication Data
US 2020/0220956 A1 Jul. 9, 2020

(30) Foreign Application Priority Data

Jan. 8, 2019 (CN) .......................... 201910016684.7

(51) Int. Cl.
*H04M 1/02* (2006.01)
*H04N 5/225* (2006.01)

(52) U.S. Cl.
CPC ........ *H04M 1/0264* (2013.01); *H04N 5/2252* (2013.01); *H04N 5/2253* (2013.01); *H04N 5/2254* (2013.01); *H04N 5/2257* (2013.01)

(58) Field of Classification Search
CPC . H04M 1/0264; H04N 5/2252; H04N 5/2253; H04N 5/2254; H04N 5/2257; G02B 7/04; G02B 7/1805
See application file for complete search history.

(56) References Cited

U.S. PATENT DOCUMENTS

| 2015/0042870 A1* | 2/2015 | Chan | G02B 26/0816 359/733 |
| 2015/0215542 A1* | 7/2015 | Nomura | G02B 13/0065 348/208.11 |
| 2018/0239162 A1* | 8/2018 | Lee | H04N 5/2328 |

(Continued)

FOREIGN PATENT DOCUMENTS

| CN | 205139547 B1 | 4/2016 |
| CN | 107942605 A1 | 4/2018 |

OTHER PUBLICATIONS

PCT search report dated Mar. 29, 2019 by SIPO in related PCT Patent Application No. PCT/CN2019/071265 (4 Pages).

(Continued)

*Primary Examiner* — Sinh Tran
*Assistant Examiner* — Zhenzhen Wu
(74) *Attorney, Agent, or Firm* — W&G Law Group

(57) ABSTRACT

An image capturing device and a mobile electronic device are provided. The image capturing device includes a frame, a flexible circuit board connected to the frame, a camera lens assembly mounted at the middle of the frame, a first prism unit mounted at one end of the frame and at an object side of the camera lens assembly to receive light, a second prism unit mounted at another end of the frame and at an image side of the camera lens assembly, a first voice coil motor for driving the second prism unit to rotate about an X-axis direction in the frame, and a second voice coil motor for driving the second prism unit to rotate about a Y-axis direction in the frame. The first and second voice coil motors are electrically connected to the flexible circuit board. An overall appearance of a mobile electronic device is not affected.

9 Claims, 10 Drawing Sheets

(56) References Cited

U.S. PATENT DOCUMENTS

| | | | |
|---|---|---|---|
| 2019/0049687 A1* | 2/2019 | Bachar | G02B 13/0065 |
| 2019/0227199 A1* | 7/2019 | Kao | H02K 41/0356 |
| 2020/0400464 A1* | 12/2020 | Yedid | H04N 5/2257 |
| 2021/0136261 A1* | 5/2021 | Lee | G03B 30/00 |
| 2022/0004018 A1* | 1/2022 | Kang | G02B 7/1805 |

OTHER PUBLICATIONS

1st Office Action dated Jan. 6, 2020 by SIPO in related Chinese Patent Application No. 201910016684.7(10 Pages).

* cited by examiner

IMAGE CAPTURING DEVICE AND MOBILE ELECTRONIC DEVICE

TECHNICAL FIELD

The present disclosure relates to the field of optical imaging technologies, and particularly, to an image capturing device applied to a mobile electronic device such as a cellphone.

BACKGROUND

With the development of imaging technologies and electronic products having an imaging function, optical camera lenses are widely applied in various electronic products. In the related art, for a general camera lens, light is directly incident from an object side, passes through a lens set along an optical axis and reaches an imaging chip (sensor). Taking a cellphone as an example, incident light reaches the imaging chip along a thickness direction of the cellphone from a screen side. With the above design, when the number of lenses of a camera lens is relatively large, the cellphone needs to provide thicker space, or the lenses will protrude outwards, which does not meet the requirements of a slim trend and requirements on a beautiful appearance.

Therefore, it is necessary to provide an image capturing device to solve the problem in the related art that an overall appearance of a mobile electronic device is affected if the number of lenses of a camera lens is relatively large.

SUMMARY

The present disclosure provides an image capturing device that does not affect an overall appearance of a mobile electronic device when the number of lenses of a camera lens is relatively large.

The present disclosure provides an image capturing device. The image capturing device includes a frame, a flexible circuit board connected to the frame, a camera lens assembly mounted at a middle of the frame, a first prism unit mounted at one end of the frame and at an object side of the camera lens assembly and configured to receive light, a second prism unit mounted at another end of the frame and at an image side of the camera lens assembly, a first voice coil motor configured to drive the second prism unit to rotate about an X-axis direction in the frame, and a second voice coil motor for configured to drive the second prism unit to rotate about a Y-axis direction in the frame. The first voice coil motor and the second voice coil motor each are electrically connected to the flexible circuit board, and the X-axis direction is perpendicular to the Y-axis direction.

In an embodiment, the first prism unit comprises a first prism configured to receive light incident along the Y-axis direction and to reflect the light incident along the Y-axis direction to the camera lens assembly along a Z-axis direction, and the second prism unit comprises a second prism configured to receive light from the camera lens assembly and to reflect the light from the camera lens assembly along the X-axis direction, wherein the Z-axis direction is perpendicular to the X-axis direction and Y-axis direction.

In an embodiment, the second prism unit further comprises a first frame body rotatably connected to the frame and a second frame body rotatably connected to the first frame body, and the second prism is mounted in the second frame body; the first voice coil motor comprises a first voice coil and a first magnet that forms a magnetic gap with the first voice coil, the first voice coil is fixed relative to the frame, and the first magnet is mounted on the first frame body; and the second voice coil motor comprises a second voice coil and a second magnet that forms a magnetic gap with the second voice coil, the second voice coil is fixed relative to the flexible circuit board, and the second magnet is mounted on the second frame body.

In an embodiment, the second prism unit further comprises a limiting spring, the limiting spring comprising one end connected to the first frame body and another end connected to the frame.

In an embodiment, the second prism unit further comprises at least one limiting pin, the first frame body is provided with at least one limiting hole, each of the at least one limiting pin includes one end mounted on the second frame body and another end inserted in one of the at least one limiting hole, and has an outer diameter smaller than an inner diameter of the one of the at least one limiting hole.

In an embodiment, the at least one limiting pin comprises two limiting pins mounted on two sides of the second frame body, respectively; and the at least one limiting hole comprises two limiting holes located at two sides of the first frame body, respectively.

In an embodiment, the image capturing device further comprises a third voice coil motor configured to adjust a movement of the camera lens assembly in the frame along the Z-axis direction and electrically connected to the flexible circuit board, and the camera lens assembly comprises a camera lens comprising a lens barrel and a lens set arranged in the lens barrel, the third voice coil motor comprises a third voice coil and a third magnet that forms a magnetic gap with the third voice coil, the third voice coil is fixed relative to the frame, and the third magnet is mounted on the lens barrel.

In an embodiment, the camera lens assembly further comprises two guiding rods, one of the two guiding rods being mounted at one side of the frame facing away from the third voice coil motor and being clamped to the lens barrel, and the other of the two guiding rods being mounted on the lens barrel and being slidably connected to the other side of the frame.

In an embodiment, the image capturing device further comprises an imaging element configured to receive light reflected by the second prism unit, and the imaging element comprises a circuit board and a sensor electrically connected to the circuit board and is mounted on the frame.

The present disclosure provides a mobile electronic device comprising a housing and the image capturing device according to any one of above embodiments, and the image capturing device is mounted in the housing.

In the present disclosure, light incident along the Y-axis direction is reflected by the first prism unit, then enters the camera lens assembly along the Z-axis direction, then is reflected by the second prism unit, and then exits along the X-axis direction, which does not affect an overall appearance of a mobile electronic device including the image capturing device even if the number of lenses of a camera lens is relatively large. At the same time, the first voice coil motor configured to drive the second prism unit to rotate about the X-axis direction in the frame and the second voice coil motor configured to drive the second prism unit to rotate about the Y-axis direction in the frame are arranged in the image capturing device in such a manner that the second prism unit can automatically correct its angles under the driving of the first voice coil motor and second voice coil motor, which achieves a wider imaging angle of the image capturing device and a better imaging effect.

Figure 1:
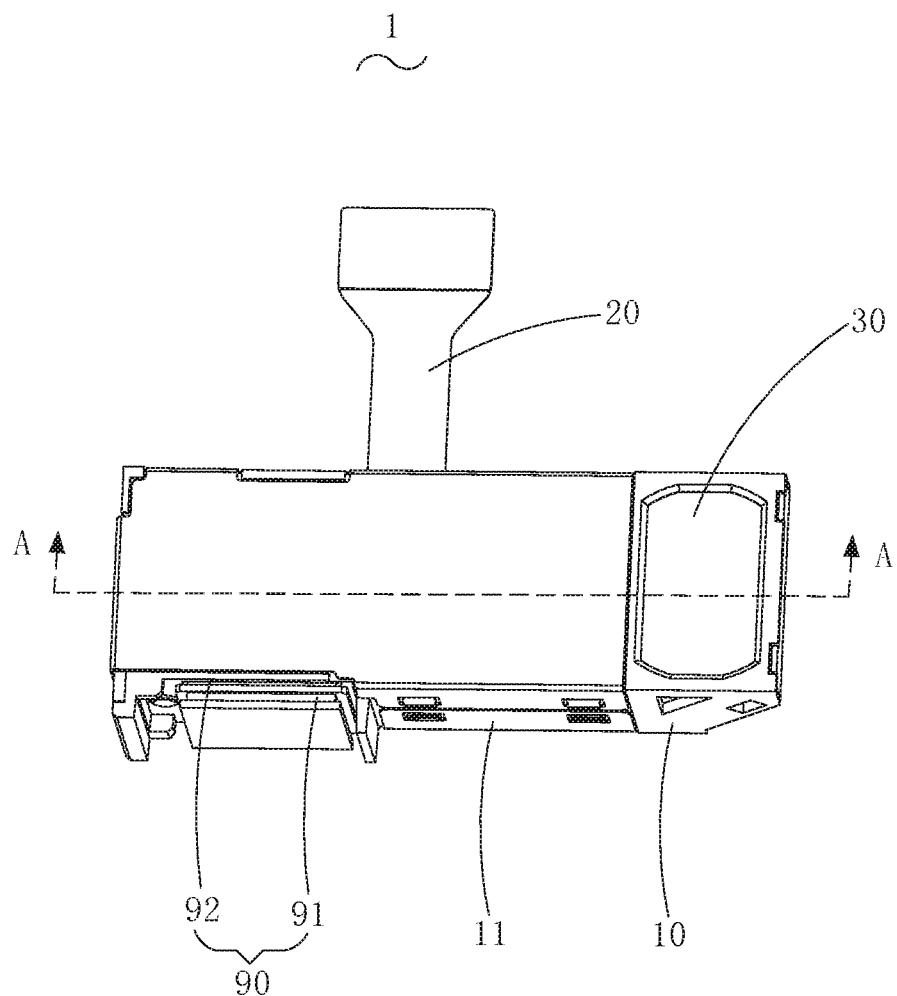
FIG. 1 is a perspective view of an image capturing device of the present disclosure.

In these figures, the following numerals represent the following components: 1—image capturing device, 10—frame, 11—enclosure, 12—guiding groove, 20—flexible circuit board, 30—first prism unit, 31—first prism, 40—camera lens assembly, 41—camera lens, 411—lens barrel, 412—lens set, 42—guiding rod, 50—second prism unit, 51—first frame body, 511—limiting hole, 52—second frame body, 53—second prism, 54—first rotating shaft, 55—guiding column, 56—second rotating shaft, 57—limiting spring, 58—limiting pin, 60—first voice coil motor, 61—first voice coil, 62—first magnet, 70—second voice coil motor, 71—second voice coil, 72—second magnet, 80—third voice coil motor, 81—third voice coil, 82—third magnet, 90—imaging element, 91—circuit board, 92—sensor, 100—mobile electronic device, and 110—housing.

DETAILED DESCRIPTION

The followings will further describe the present disclosure combining with embodiments and the drawings.

It should be noted that all directional indications (such as upper, lower, inner, outer, top, bottom, etc.) in the present disclosure are only used to explain relative positional relations between components under a specific posture (as shown in the figures). If the specific posture changes, the directional indications will change accordingly.

It should be also noted that when a component is referred to as "being fixed to" or "being arranged on" another component, the component can be directly disposed on the other component, or there is an intermediate component therebetween at the same time. When a component is referred to as "being connected to" another component, the component can be directly connected to another component, or there is an intermediate component therebetween at the same time.

Referring to FIGS. 1-9, an embodiment of the present disclosure provides an image capturing device 1, and the image capturing device 1 comprises a frame 10, a flexible circuit board 20, a first prism unit 30, a camera lens assembly 40, a second prism unit 50, a first voice coil motor 60, a second voice coil motor 70, a third voice coil motor 80, and an imaging element 90. The first prism unit 30 and the second prism unit 50 are mounted at two ends of the frame 10, respectively. The camera lens assembly 40 is mounted at the middle of the frame 10 and between the first prism unit 30 and the second prism unit 50. The flexible circuit board 20 is mounted on the frame 10. In the present embodiment, both the first voice coil motor 60 and the second voice coil motor 70 are electrically connected to the flexible circuit board 20. To prevent external light from directly entering the camera lens assembly 40, an enclosure 11 is provided to cover the frame 10. In the present disclosure, a width direction of the frame 10 is defined as an X-axis direction, a height direction of the frame 10 is defined as a Y-axis direction, and a length direction of the frame 10 is defined as a Z-axis direction. Any two of the X-axis direction, the Y-axis direction and the Z-axis direction are perpendicular to each other. In an embodiment, the first prism unit 30 is slidably connected to the frame 10 and is located at an object side of the camera lens assembly 40. The second prism unit 50 is located at an image side of the camera lens assembly 40. Light incident along the Y-axis direction is reflected by the first prism unit 30, and then enters the camera lens assembly 40 along the Z-axis direction. Light entering the camera lens assembly 40 along the Z-axis direction is reflected by the second prism unit 50, exits along the X-axis direction, and reaches the imaging element 90.

In the present embodiment, the first voice coil motor 60 is configured to drive the second prism unit 50 to rotate about the X-axis direction in the frame 10, and the second voice coil motor 70 is configured to drive the second prism unit 50 to rotate about the Y-axis direction in the frame 10, and the second prism unit 50 automatically correct its angles under the driving of the first voice coil motor 60 and second voice coil motor 70, which achieves a wider imaging angle of the image capturing device 1 and a better imaging effect.

Figure 2:
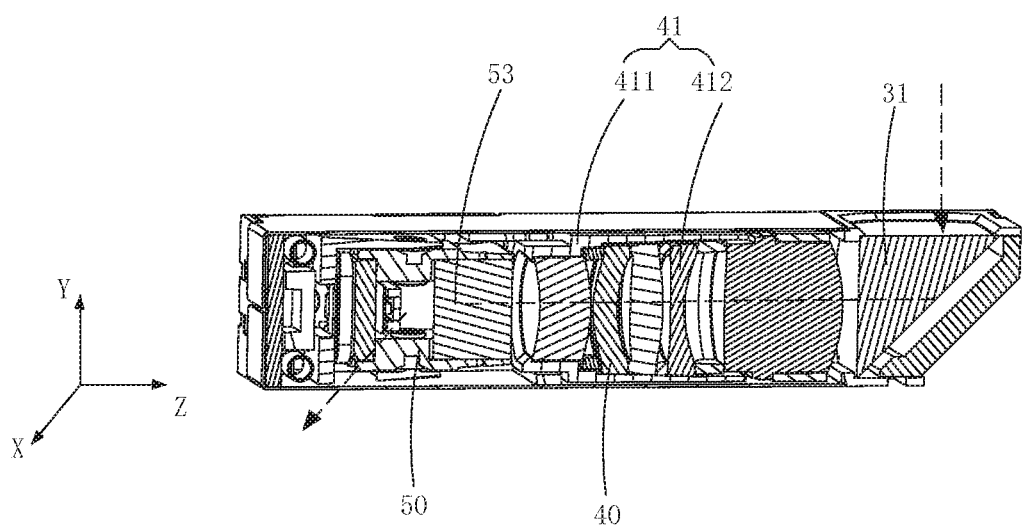
FIG. 2 is a sectional view of the image capturing device taken along line A-A in FIG. 1.
Figure 3:
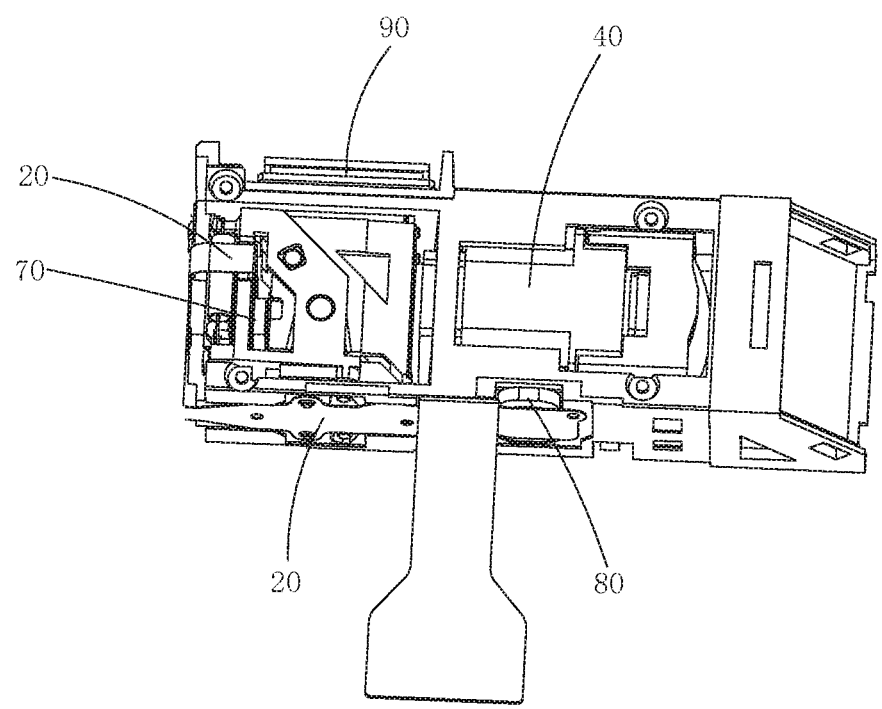
FIG. 3 is a perspective view of an image capturing device with its enclosure removed.
Figure 4:
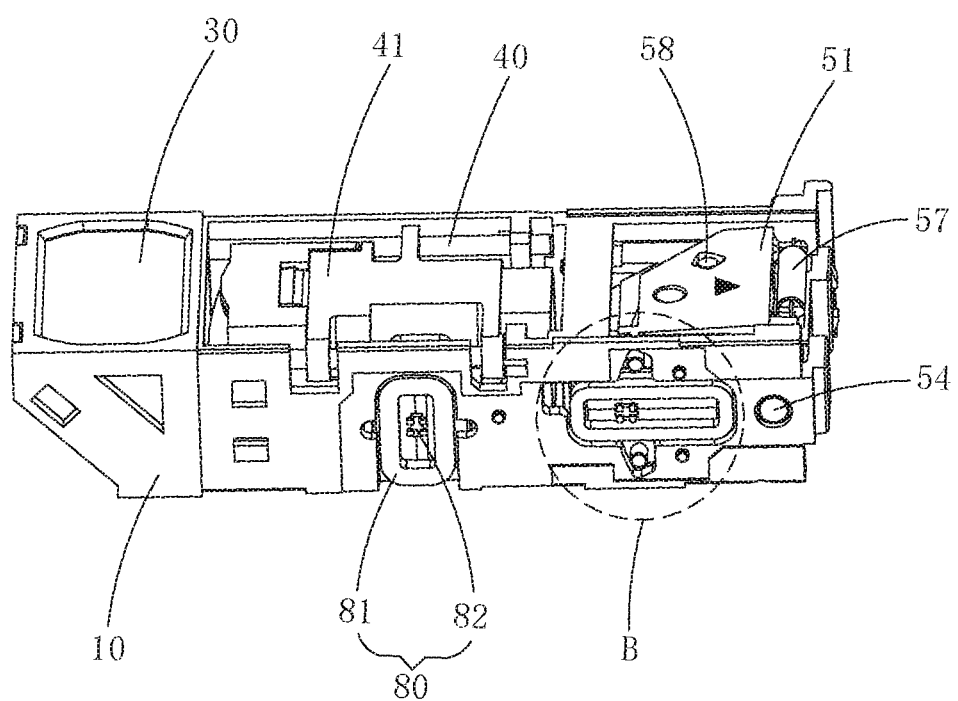
FIG. 4 is a perspective view of the image capturing device in FIG. 3 with its imaging element and flexible circuit board removed.
Figure 5:
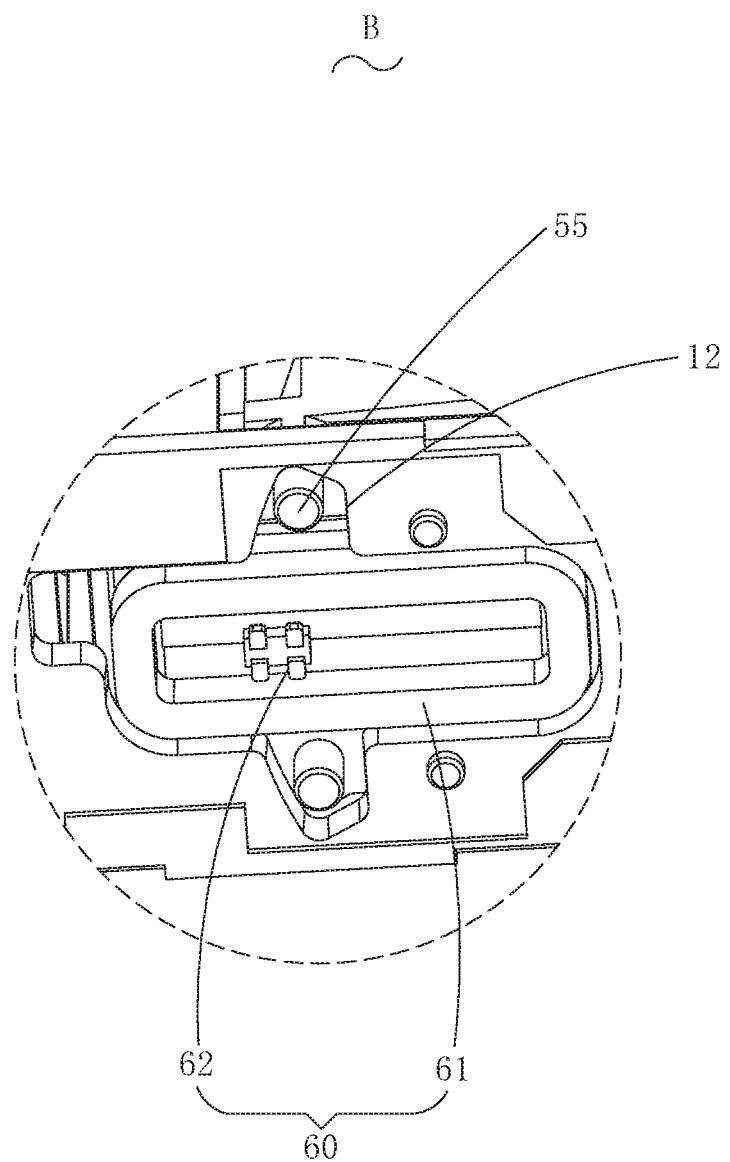
FIG. 5 is a partially enlarged view of an area B in FIG. 4.
Figure 6:
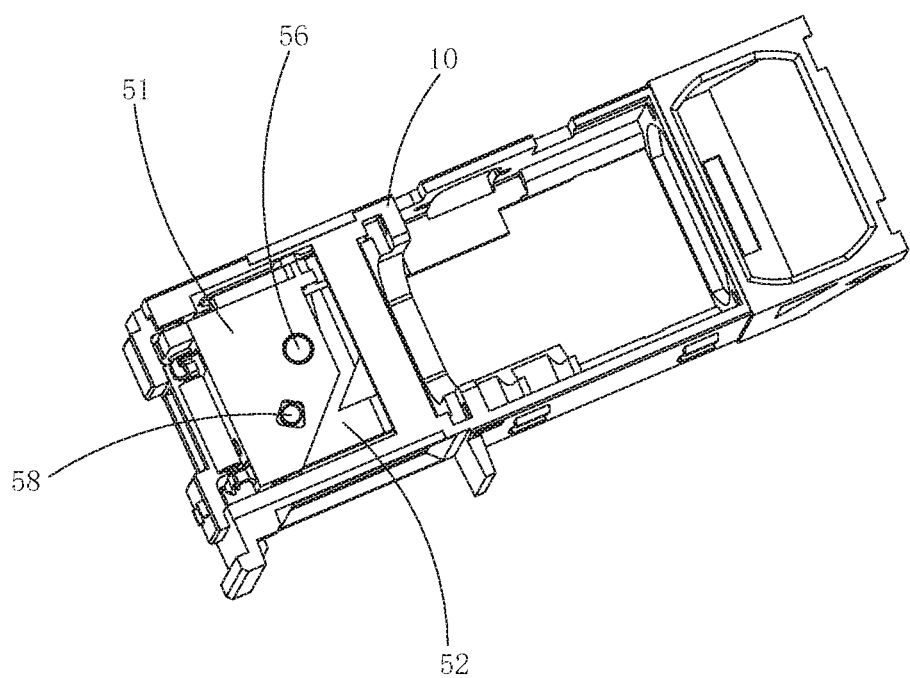
FIG. 6 is a perspective view of an image capturing device in FIG. 4 with its camera lens assembly and first prism unit removed.
Figure 7:
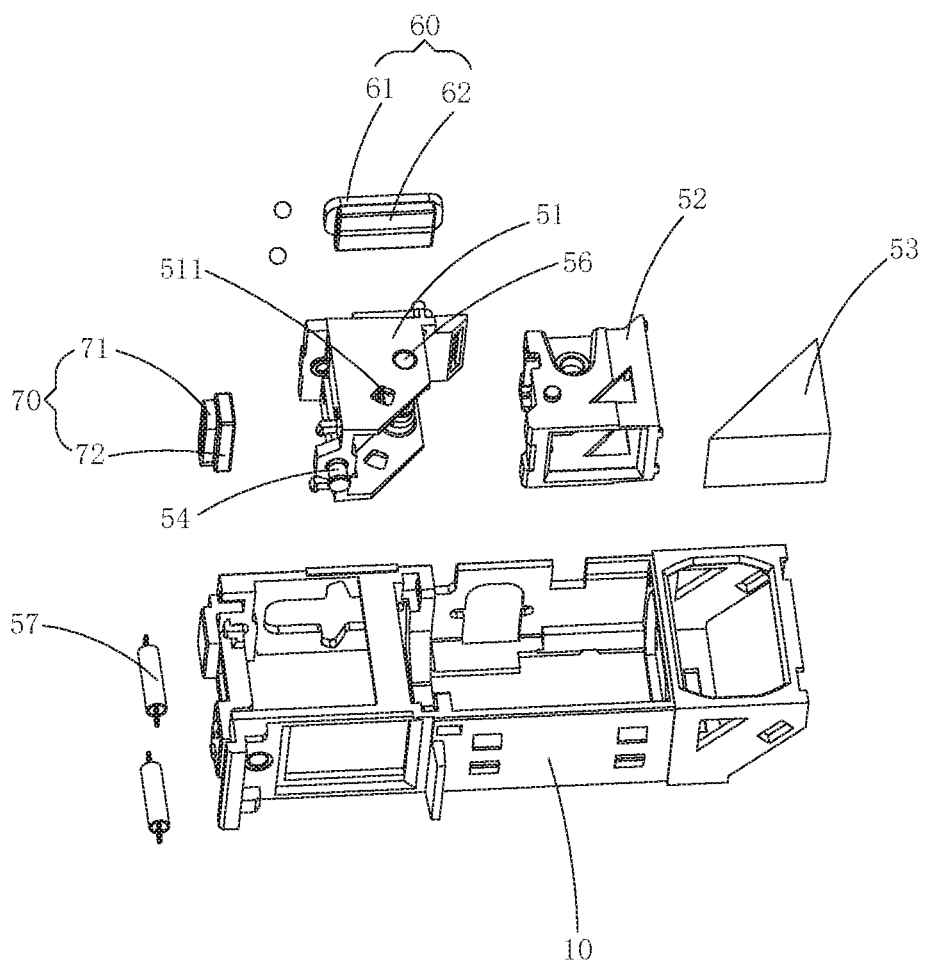
FIG. 7 is an exploded view of an image capturing device in FIG. 6.
Figure 8:
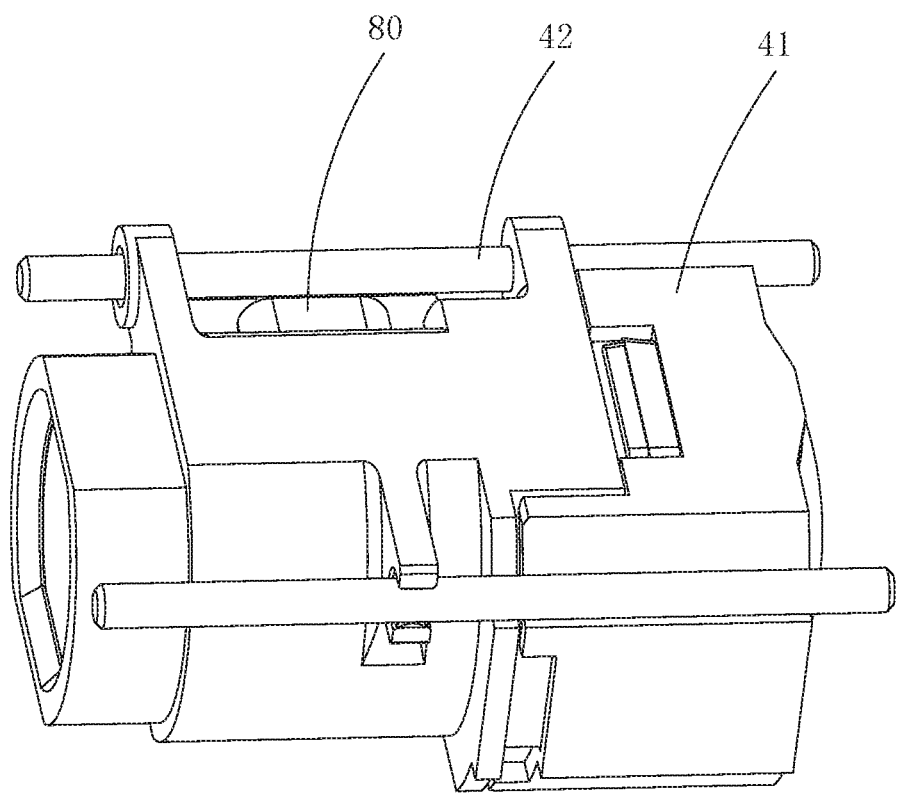
FIG. 8 is a perspective view of a third voice coil motor mounted on a camera lens assembly according to the present disclosure.
Figure 9:
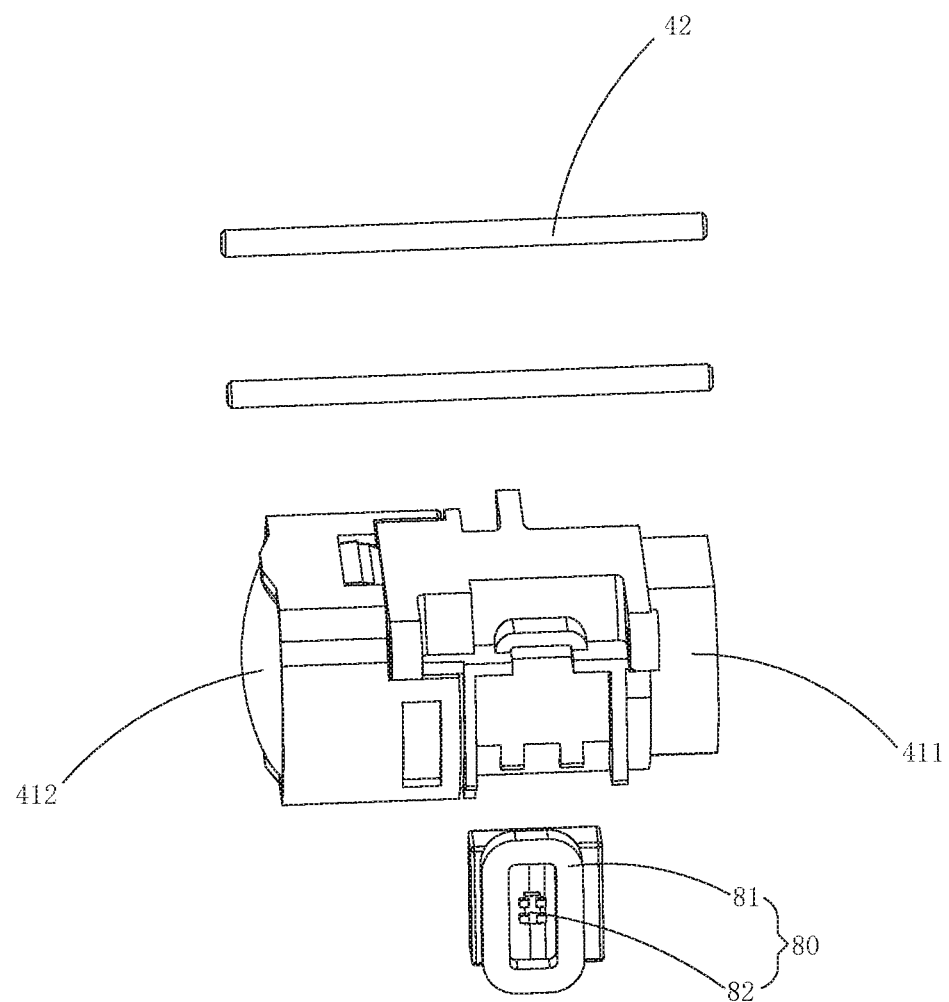
FIG. 9 is an exploded view of FIG. 8.

Referring to FIG. 2 and FIG. 7, in an embodiment of the present disclosure, the first prism unit 30 comprises a first lens 31, and the second prism unit 50 comprises a first frame body 51 slidably connected to the frame 10, a second frame body 52 rotatably connected to the first frame body 51, and a second prism 53 mounted in the second frame body 52. The second prism 53 moves synchronously with the second frame body 52. In the present embodiment, the first prism 31 is configured to receive light incident along the Y-axis direction and to reflect the received light to the camera lens assembly 40 along the Z-axis direction. The second prism 53 is configured to receive light from the camera lens assembly 40 and to reflect the received light along the X-axis direction. The first voice coil motor 60 comprises a first voice coil 61 and a first magnet 62 that forms a magnetic gap with the first voice coil 61. The first voice coil 61 can be mounted on the flexible circuit board 20. In an embodiment, the first voice coil 61 can be mounted on the frame 10, and the first magnet 62 is mounted on the first frame body 51. The second voice coil motor 70 comprises a second voice coil 71 and a second magnet 72 that forms a magnetic gap with the second voice coil 71. The second voice coil 71 is mounted on the flexible circuit board 20. The second magnet 72 is mounted on the second frame body 52. In this way, the first voice coil motor 60 can adjust the second prism unit 50 to rotate in the frame 10 about the X-axis direction, and the second voice coil motor 70 can adjust the second prism unit 50 to rotate in the frame 10 about the Y-axis direction.

In an embodiment, the second prism unit 50 further comprises a first rotating shaft 54, a guiding column 55, a second rotating shaft 56 and a limiting spring 57. The first frame body 51 is rotatably connected to the frame 10 via the first rotating shaft 54. When the first voice coil motor 60 is energized, the first voice coil 61 generates an induced magnetic field to interact with a permanent magnetic field generated by the first magnet 62, so that the first frame body 51 and the second frame body 52 are driven together to rotate about the first rotating axis 54, i.e., rotating about an X-axis. To make a side of the first frame body 51 facing away from the first rotating shaft 54 to rotate more stably, two guiding columns 55 are mounted at one side of the first frame body 51 facing away from the first rotating shaft 54, two guiding grooves 12 are correspondingly arranged on the frame 10, and the two guiding columns 55 are respectively inserted into the two guiding grooves 12 and can respectively slide therein. The first frame body 51 and the second frame body 52 are rotatably connected via a second rotating shaft 56. When the second voice coil motor 70 is energized, the second voice coil 71 generates an induced magnetic field to interact with a permanent magnetic field generated by the second magnet 72, so that the second frame body 52 is driven to rotate about the second rotating shaft 56, i.e., a Y-axis. To keep balance of the first frame body 51, the limiting spring 57 is arranged close to the first rotating shaft 54, one end of the limiting spring 57 is connected to the first frame body 51, and another end there of the limiting spring 57 is connected to the frame 10.

In an embodiment, the first prism unit 30 further comprises a limiting pin 58. A limiting hole 511 is provided on the first frame body 51. One end of the limiting pin 58 is mounted on the second frame body 52, and another end of the limiting pin 58 is inserted into the limiting hole 511. An outer diameter of the limiting pin 58 is smaller than an inner diameter of the limiting hole 511, so that the second frame body 52 can rotate slightly relative to the first frame body 51.

In an embodiment, the number of the second rotating shaft 56 and the number of the limiting pins 58, and the number of the limiting holes 511 each are 2. The two second rotating shafts 56 and the two limiting pins 58 are mounted at an upper end and a lower end of the second frame body 52, respectively. The two limiting holes 511 are located at an upper end and a lower end of the first frame body 51, respectively, so that the second frame body 52 and the second prism 53 rotate more stably during a rotation process.

The image capturing device 1 further comprises a third voice coil motor 80 configured to adjust a movement of the camera lens assembly 40 in the frame 10 along the Z-axis direction. The camera lens assembly 40 comprises the camera lens 41 and two guiding rods 42. The camera lens 41 comprises a lens barrel 411 and a lens set 412 arranged in the lens barrel 411. The third voice coil motor 80 comprises a third voice coil 81 and a third magnet 82 that forms a magnetic gap with the third voice coil 81. The third voice coil 81 can be mounted on and electrically connected to the flexible circuit board 20. In an embodiment, the third voice coil 81 can be mounted on the frame 10. The third magnet 82 is fixedly mounted on an outer sidewall of the lens barrel 411. One guiding rod 42 is mounted at a side of the frame 10 facing away from the third voice coil motor 80, and the lens barrel 411 is clamped to the guiding rod 42. The other guiding rod 42 is fixedly mounted on the lens barrel 411 and is slidably connected to another side of the frame 10, so that the third voice coil motor 80 can drive the camera lens 41 to move along the Z-axis direction to adjust a focal length.

In an embodiment, the imaging element 90 comprises a circuit board 91 and a sensor 92 electrically connected to the circuit board 91. The imaging element 90 is configured to receive light reflected by the second prism unit 50 so as to perform imaging in the imaging element 90. The imaging element 90 is mounted on the frame 10 and faces the second prism 53.

Figure 10:
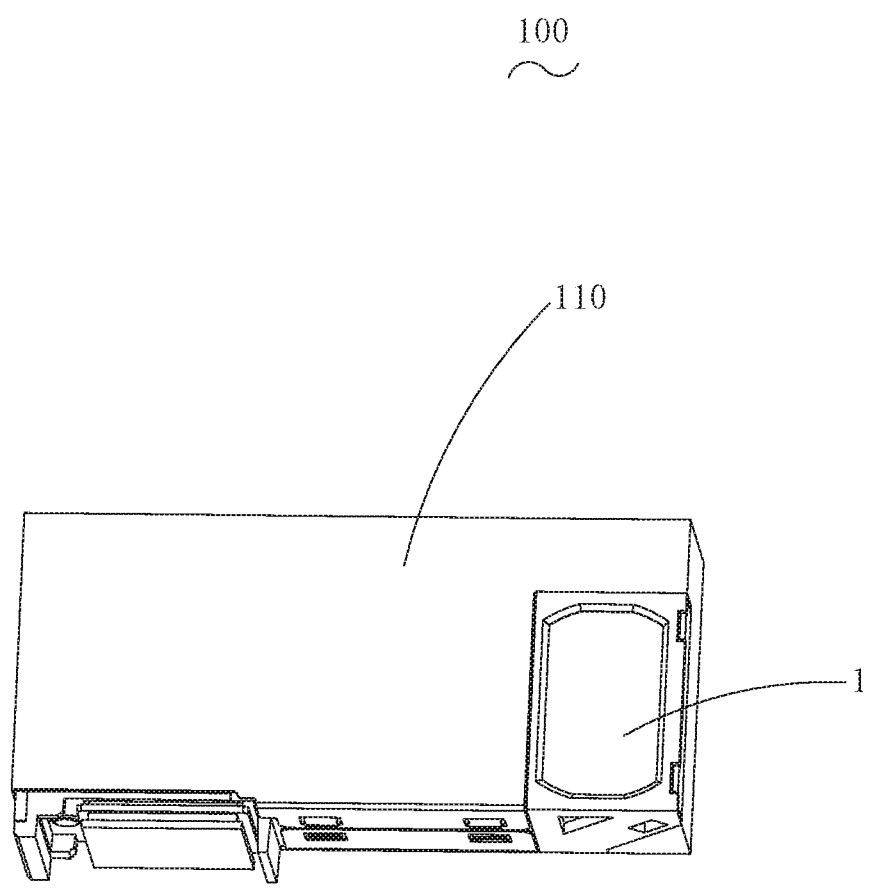
FIG. 10 is a perspective view of a mobile electronic device.

Referring to FIG. 10, the present disclosure further provides a mobile electronic device 100 comprising a housing 110 and the above image capturing device 1 that is mounted in the housing 110. A length direction of the housing 110 is identical with the Z-axis direction, a width direction of the housing 110 is identical with the X-axis direction, and a thickness direction of the housing 110 is identical with the Y-axis direction. A thickness of a mounting space of the image capturing device 1 in the mobile electronic device 100 is only related with a thickness of the frame 10 in the Y-axis direction. Therefore, the overall appearance size of the mobile electronic device 100 including the image capturing device 1 will not be affected even if more lenses are mounted in the camera lens assembly 40.

The above merely provides embodiments of the present disclosure. It should be noted here that improvements can also be made by those of ordinary skills in the art without departing from the inventive concept of the present disclosure, and shall be construed as falling within the protection scope of the present disclosure.

What is claimed is:

1. An image capturing device, comprising:
a frame;
a flexible circuit board connected to the frame;
a camera lens assembly mounted at a middle of the frame;
a first prism unit mounted at one end of the frame and at an object side of the camera lens assembly and configured to receive light;
a second prism unit mounted at another end of the frame and at an image side of the camera lens assembly;
a first voice coil motor configured to drive the second prism unit to rotate about an X-axis direction in the frame; and
a second voice coil motor for configured to drive the second prism unit to rotate about a Y-axis direction in the frame,
wherein the first voice coil motor and the second voice coil motor each are electrically connected to the flexible circuit board, and the X-axis direction is perpendicular to the Y-axis direction;
wherein the first prism unit comprises a first prism configured to receive light incident along the Y-axis direction and to reflect the light incident along the Y-axis direction to the camera lens assembly along a Z-axis direction, and the second prism unit comprises a second prism configured to receive light from the camera lens assembly and to reflect the light from the camera lens assembly along the X-axis direction, wherein the Z-axis direction is perpendicular to the X-axis direction and Y-axis direction;
wherein the second prism unit comprises a first frame body rotatably connected to the frame and a second frame body rotatably connected to the first frame body, the second prism mounted in the second frame body; the second prism moves synchronously with the second frame body;
the first voice coil motor drive the first frame body and the second frame body together to rotate about the X-axis relative to the frame, and the second voice coil motor drive the second frame body to rotate about the Y-axis relative to the second frame body.

2. The image capturing device as described in claim 1, wherein the first voice coil motor comprises a first voice coil and a first magnet that forms a magnetic gap with the first voice coil, the first voice coil is fixed relative to the frame, and the first magnet is mounted on the first frame body; and
wherein the second voice coil motor comprises a second voice coil and a second magnet that forms a magnetic gap with the second voice coil, the second voice coil is fixed relative to the flexible circuit board, and the second magnet is mounted on the second frame body.

3. The image capturing device as described in claim 2, wherein the second prism unit further comprises a limiting spring, the limiting spring comprising one end connected to the first frame body and another end connected to the frame.

4. The image capturing device as described in claim 2, wherein the second prism unit further comprises at least one limiting pin, the first frame body is provided with at least one limiting hole, each of the at least one limiting pin includes one end mounted on the second frame body and another end inserted in one of the at least one limiting hole, and has an outer diameter smaller than an inner diameter of the one of the at least one limiting hole.

5. The image capturing device as described in claim 4, wherein the at least one limiting pin comprises two limiting pins mounted on two sides of the second frame body, respectively; and the at least one limiting hole comprises two limiting holes located at two sides of the first frame body, respectively.

6. The image capturing device as described in claim 1, further comprising:
  a third voice coil motor configured to adjust a movement of the camera lens assembly in the frame along the Z-axis direction and electrically connected to the flexible circuit board,
  wherein the camera lens assembly comprises a camera lens comprising a lens barrel and a lens set arranged in the lens barrel, the third voice coil motor comprises a third voice coil and a third magnet that forms a magnetic gap with the third voice coil, the third voice coil is fixed relative to the frame, and the third magnet is mounted on the lens barrel.

7. The image capturing device as described in claim 6, wherein the camera lens assembly further comprises two guiding rods, one of the two guiding rods being mounted at one side of the frame facing away from the third voice coil motor and being clamped to the lens barrel, and the other of the two guiding rods being mounted on the lens barrel and being slidably connected to the other side of the frame.

8. The image capturing device as described in claim 1, further comprising:
  an imaging element configured to receive light reflected by the second prism unit,
  wherein the imaging element comprises a circuit board and a sensor electrically connected to the circuit board and is mounted on the frame.

9. A mobile electronic device, comprising a housing and an image capturing device mounted in the housing, wherein the image capturing device comprises:
  a frame;
  a flexible circuit board connected to the frame;
  a camera lens assembly mounted at a middle of the frame;
  a first prism unit mounted at one end of the frame and at an object side of the camera lens assembly and configured to receive light;
  a second prism unit mounted at another end of the frame and at an image side of the camera lens assembly;
  a first voice coil motor configured to drive the second prism unit to rotate about an X-axis direction in the frame; and
  a second voice coil motor for configured to drive the second prism unit to rotate about a Y-axis direction in the frame,
  wherein the first voice coil motor and the second voice coil motor each are electrically connected to the flexible circuit board, and the X-axis direction is perpendicular to the Y-axis direction;
  wherein the first prism unit comprises a first prism configured to receive light incident along the Y-axis direction and to reflect the light incident along the Y-axis direction to the camera lens assembly along a Z-axis direction, and the second prism unit comprises a second prism configured to receive light from the camera lens assembly and to reflect the light from the camera lens assembly along the X-axis direction, wherein the Z-axis direction is perpendicular to the X-axis direction and Y-axis direction;
  wherein the second prism unit comprises a first frame body rotatably connected to the frame and a second frame body rotatably connected to the first frame body, the second prism mounted in the second frame body; the second prism moves synchronously with the second frame body;
  the first voice coil motor drive the first frame body and the second frame body together to rotate about the X-axis relative to the frame, and the second voice coil motor drive the second frame body to rotate about the Y-axis relative to the second frame body.

* * * * *